United States Patent

Meurisse et al.

[11] Patent Number: 5,959,973
[45] Date of Patent: Sep. 28, 1999

[54] METHOD TO CONTROL DATA FLOW RATE, QUEUING NETWORK NODE AND PACKET SWITCHING NETWORK

[75] Inventors: Wim Pol Meurisse, Harelbeke; Rudy Georges Hoebeke; Johan Hilda Witters, both of Antwerpen, all of Belgium

[73] Assignee: Alcatel Alsthom Compagnie Generale d'Electricite, Paris, France

[21] Appl. No.: 08/820,587

[22] Filed: Mar. 19, 1997

[30] Foreign Application Priority Data

Mar. 20, 1996 [EP] European Pat. Off. .............. 96200775

[51] Int. Cl.⁶ .............................. H04L 12/56; H04L 12/24
[52] U.S. Cl. ............................................. 370/232; 370/236
[58] Field of Search ..................................... 370/230, 232, 370/233, 234, 235, 236, 252, 253, 395, 412, 468

[56] References Cited

U.S. PATENT DOCUMENTS

| | | | |
|---|---|---|---|
| 5,315,587 | 5/1994 | Kullander | 370/235 |
| 5,633,859 | 5/1997 | Jain et al. | 370/234 |
| 5,701,292 | 12/1997 | Chiussi et al. | 370/232 |
| 5,774,455 | 6/1998 | Kawase et al. | 370/232 |

FOREIGN PATENT DOCUMENTS

| | | |
|---|---|---|
| 0538220 | 4/1993 | European Pat. Off. . |
| WO932063 | 10/1993 | WIPO . |

OTHER PUBLICATIONS

"ABR: Realizing the Promise of ATM", N. Rickard, *Telecommunications*, vol. 29, No. 4, Apr. 1995, pp. 27–33.

*Primary Examiner*—Hassan Kizou
*Assistant Examiner*—Mitchell Slavitt
*Attorney, Agent, or Firm*—Ware, Fressola, Van Der Sluys & Adolphson LLP

[57] ABSTRACT

As long as a queuing network node (Q) is not congested, it returns to the source terminals (S1, S2, S3, S4) transmitting data packets through this queuing network node (Q), upper packet rate values (ER) which are proportional to the actual packet rate values (CCR). The transmit rate of a source terminal (S1, S2, S3, S4) upon receipt of the upper packet rate value (ER), is controlled so that it stays below this upper packet rate value. In this way, the queuing network node (Q) allows its aggregate input rate to increase in a controlled, smooth way and does not rely on the sources (S1, S2, S3, S4) themselves. Once the queuing network node (Q) gets congested a fair share algorithm is used to determine which source terminals have to decrease their transmit rates and which source terminals are allowed to further increase their transmit rates.

10 Claims, 3 Drawing Sheets

METHOD TO CONTROL DATA FLOW RATE, QUEUING NETWORK NODE AND PACKET SWITCHING NETWORK

BACKGROUND OF THE INVENTION

1. Technical Field

The present invention relates to a method to control data flow rate of data transmitted over a connection set up between a source terminal and a destination terminal via a plurality of network links and network nodes at least one of which constitutes a queuing network node which is able to return data flow control packets to the source terminal, the data flow control packets containing information based on which the data flow rate is to be controlled in the source terminal, a queuing network node wherein the method is performed, and a packet switching network including such a queuing network node

2. Description of Related Art

Such a method, queuing network node and packet switching network are already known in the art, e.g. from the international application published under the Patent Cooperation Treaty (PCT) with reference number WO 93/2063 and with title 'Congestion Control For Cell Networks'. Therein, a packet switching network named a cell switching communication network is described wherein so called source nodes transmit data packets to so called destination nodes via network nodes and network lines. Such a network node can be provided with a buffer, in which case it performs the role of a queuing point for bursty traffic that is rather delay insensitive. In such a queuing point, the state of congestion is determined by monitoring the buffer filling level and when congestion is expected, feedback data flow control packets constituting a so called feedback rate control signal, are sent from the queuing point to the source nodes. Upon receipt thereof, a source node adapts its transmit rate. More specifically, the queuing points in the known network return two bit codewords to the source nodes when congestion is expected to make these source nodes either decrease, quickly decrease, remain constant or increase their transmit rates. Since it is not checked anywhere in the network how a source node has adapted its transmit rate, the known network relies upon fair behavior of the source nodes. These sources however may increase their transmission rates in a fraudulent way thereby increasing the probability for buffer overflow and data loss in the packet switching network. In a transmission class such as the Available Bit Rate (ABR) class defined by the ATM Forum in the draft Standard with reference ATM Forum\95-0013R10, source nodes are supposed to increase their transmit rates exponentially. If however some of the sources increase their transmit rates stepwise instead of exponentially, queuing points in the network may get overloaded and consequently the network may fail to observe the traffic contracts made up between ABR subscribers and the network operator.

SUMMARY OF THE INVENTION

An object of the present invention is to provide a method, a queuing network node and a packet switching network of the above known type, but wherein the above mentioned shortcomings are overcome.

According to a first aspect of the present invention, a method to control a data flow rate of data transmitted over a connection set up between a source terminal and a destination terminal via a plurality of network links and network nodes at least one of which constitutes a queuing network node which is able to return data flow control packets to said source terminal, said data flow control packets containing information based on which said data flow rate is to be controlled in said source terminal, is characterized in that, in a first state wherein said queuing network node is not congested, said queuing network node before a said data flow control packet is returned, performs the steps of:

a. obtaining an actual packet rate of data transmitted over said connection;
b. calculating an upper packet rate value in proportion to said actual packet rate;
c. embedding said upper packet rate value in said data flow control packet; and
d. keeping said data flow rate at said source terminal below said upper packet rate value.

According to a second aspect of the present invention, a queuing network node for instance for use in a packet switching network comprising a plurality of source terminals, a plurality of destination terminal coupled to said source terminals via network links and network node including said queuing network node, said queuing network node comprising:

a. buffer means adapted to temporarily store data packets of a plurality of connections set up between said source terminals and said destination terminals and passing through said queuing network node;
b. control packet filtering means adapted to filter data flow control packets out of a sequence of data packets transmitted by a source terminal; and
c. control packet processing means adapted to process said data flow control packets;
is characterized in that said control packet processing means is equipped with:
d. means adapted to obtain an actual packet rate for each one of said connections passing through said queuing network node;
e. calculation means adapted to calculate for each one of said connections an upper packet rate value proportional to said actual packet rate; and
f. means to embed said upper packet rate in a said data flow control packet to be returned to said source terminal.

According to a third aspect of the present invention, a packet switching network comprising a plurality of source terminals, a plurality of destination terminals coupled to said source terminals via network links and network nodes at least one of which constitutes a queuing network node including:

a. buffer means adapted to temporarily store data packets of a plurality of connections set up between said source terminals and said destination terminals and passing through said queuing network node;
b. control packet filtering means adapted to filter data flow control packets out of a sequence of data packets transmitted by one of said source terminals; and
c. control packet processing means adapted to process said data flow control packets;
is characterized in that said control packet processing means is equipped with:
d. means adapted to obtain an actual packet rate for each one of said connections passing through said queuing network node;
e. calculation means adapted to calculate for each one of said connections an upper packet rate value proportional to said actual packet rate; and
f. means to embed said upper packet rate in a said data flow control packet to be returned to said source terminal.

According to the invention, this object is achieved by the method as described in claim 1, in a queuing network node as described in claim 9 and in a packet switching network as described in claim 10.

In this way, by returning to a source terminal, an upper packet rate value which is proportional to the measured actual packet rate and by keeping the transmit rate below this returned upper packet rate value e.g. via output shapers as described in claim 2, the increase in transmit rate is limited for that source terminal by the network. Indeed, since the upper packet rate value is proportional to the actual packet rate of the source terminal, the source can increase its transmit rate for instance with 10 percent if the proportionality factor is equal to 1.1. Over a plurality of time intervals, the source transmit rate increases with exponentially growing steps. If the actual packet rate of a source does not increase any longer but, due to lack of data to be transmitted for example, decreases, the upper packet rate value will also decrease. This implies that bandwidth capacity automatically gets free in the packet switching network according to the present invention which is an additional advantage with respect to the known method and node wherein an explicit rate value is determined and returned to a source and wherein the source is allowed to increase its transmit rate exponentially up to this explicit rate value. Whether or not this source has sufficient data to be transmitted, the allocated bandwidth which is equal to the explicit rate value remains reserved in the known method. In the present method, as long as a queuing network node is not congested, a source terminal transmitting data packets through this queuing network node can increase its transmission rate with exponential growing steps, but it no longer has the possibility to fraudulently increase its transmission rate faster, and it immediately gives free bandwidth that is no longer used.

It has to be remarked that the European Patent Application EP 0538220 entitled 'Data Flow Control' also discloses a method to control data flow in a packet switching network wherein the source nodes increase their sending frequencies in proportion to the actual sending frequencies. In this application however, the sources are not controlled by the network to increase their sending frequencies in this way. The network trusts the sources, returns throttling orders to the sources in case congestion is detected in one of the network nodes, but does not provide any proportional feedback during the not congested state as is done in the present method.

An additional characteristic feature of the present invention is that, when the queuing network node is congested, the aggregate input flow of the queuing network node is forced to converge towards a target aggregate input flow which is shared amongst the different connections in accordance with a fair share mechanism as described in claim 3.

Hence source terminals which, at the time the congested state is entered, transmit at a low transmit rate because they started transmitting later than other source terminals, will get allocated additional bandwidth. Source terminals which, on the contrary, started transmitting earlier and during successive time intervals got the opportunity to increase their transmit rates up to a high packet rate, will have to reduce these transmit rates. Since a congested state is reached, the aggregate input packet rate of the queuing network node has to decrease. In the congested state, the target aggregate input flow is divided, whilst in the not congested state, the aggregate input and accordingly the used capacity increases in a controlled, smooth way.

It is to be remarked that the object of guiding the source transmit rates in a network controlled way towards full occupancy of the available capacity thereby avoiding risk for buffer overflow and data loss, is achieved by the technique applied in the not congested state independent of the technique that is performed in the congested state. The steps described in claim 3 for the congested state allow to refine the resources allocation once a network node is congested, but are not essential to overcome the above mentioned problem. Without the technique described by claim 3, overflow and data loss can be avoided but then some of the source terminals would remain transmitting at a rate which is below their fair share rate.

In a particular embodiment of the present method, described in claim 4, the upper packet rate value of low rate source terminals is increased in a similar way in the second state and in the first state.

An implementation of this particular embodiment is described in claim 5. Therein, it is supposed that the sum of all the fair share values over the different connections which pass through the queuing network node equals the aggregate input, i.e. the sum of all actual packet rates over the different connections at the time of entering the second state. Via the formulas described in claim 5, the aggregate input rate is kept constant, although the low rate source terminals are allowed to increase their transmit rates in proportion to the actual packet rate.

Also a feature of the present method is that the time intervals between successive data flow control packets equal one round trip time of a data flow control packet as described by claim 6.

Thus, the actual packet rate is again measured in the queuing network node after the source terminal has had the probability to increase its transmit rate up to the returned upper packet rate value.

Yet another feature of the present invention is that, to define the first and second state of a queuing node, the aggregate input thereof may be compared to the aggregate output thereof, as is described in claims 7 and 8.

Evidently, this is not an essential feature of the present invention since any other criterion to detect congestion may be used, e.g. monitoring the buffer filling length and determining the time whereon a predetermined level of filling is reached, as is done in the earlier cited international application WO 93/2063.

The above mentioned and other objects and features. of the invention will become more apparent and the invention itself will be best understood by referring to the following description of an embodiment taken in conjunction with the accompanying drawings wherein:

DESCRIPTION OF THE PREFERRED EMBODIMENT

Figure 1:
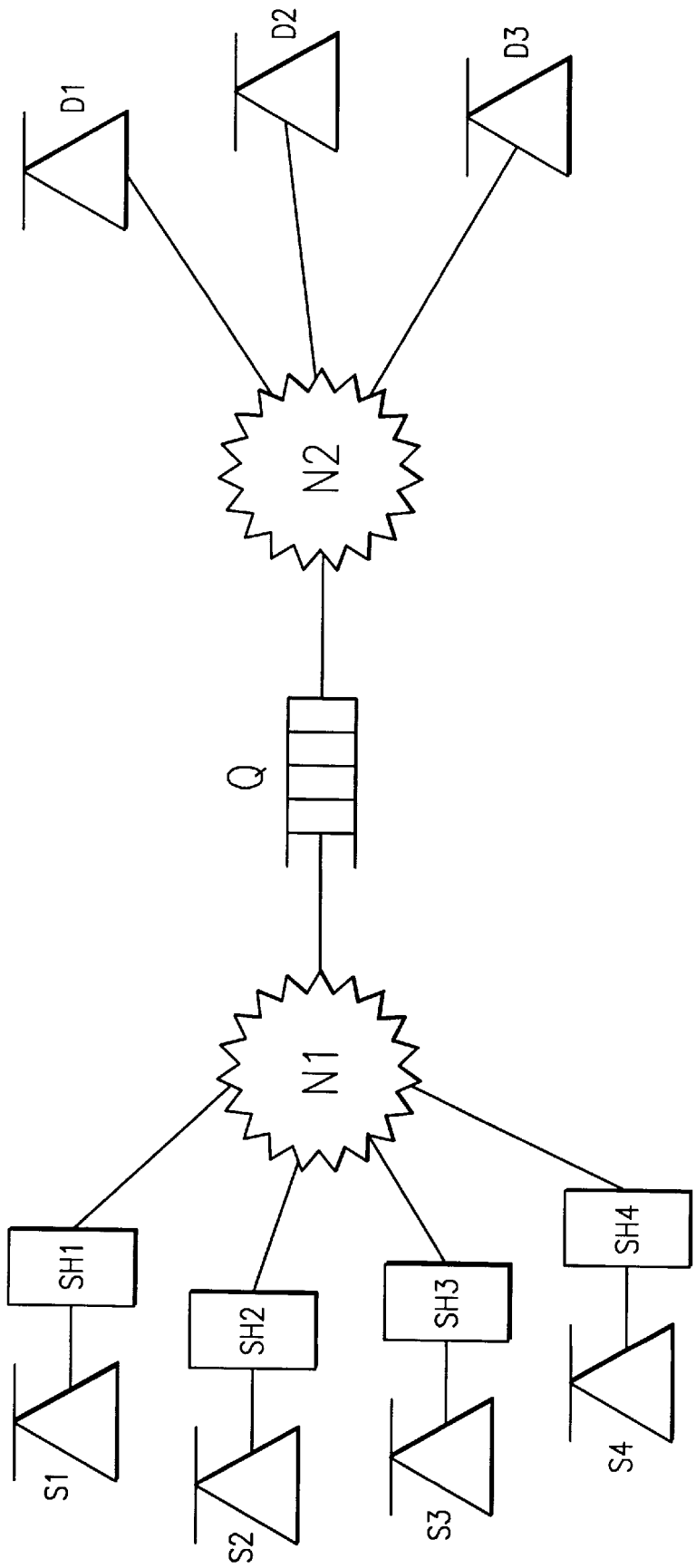
FIG. 1 is a block scheme of a packet switching network according to the present invention.

The network drawn in FIG. 1 is an Asynchronous Transfer Mode (ATM) cell switching network comprising four Available Bit Rate (ABR) source nodes S1, S2, S3, and S4 with associated output shapers SH1, SH2, SH3 and SH4, three Available Bit Rate (ABR) destination nodes D1, D2 and D3, a first switching node N1, a queuing point Q and a second switching node N2.

The ABR sources S1, S2, S3 and S4 are coupled to the first switching node N1 via respective output shapers SH1, SH2, SH3 and SH4 and respective access links. An output of the first switching node N1 is connected to an input of the queuing point Q and an output of the queuing point Q is coupled to an input of the second switching node N2. Via respective access links switching node N2 is coupled to each one of the destination nodes D1, D2 and D3.

The Asynchronous Transfer Mode (ATM) network of FIG. 1 supports several classes of service as defined by the ATM Forum. Available Bit Rate (ABR) is such a class of service which exploits excess network capacity or, in other words, bandwidth that is not yet occupied by the Constant Bit Rate, or Variable Bit Rate services. ABR is a class of service with a feedback mechanism allowing the queuing point Q and destination nodes D1, D2 and D3 of the network to report network congestion to the source nodes S1, S2, S3 and S4. The source nodes S1, S2, S3 and S4 thereupon can reduce their transmit rates so that the queuing point Q in the network does not get overloaded. ABR is dedicated to transmission of bursty, unpredictable traffic over the ATM network. An overview of the different service classes defined by the ATM Forum and of the parameters specified in ABR traffic contracts is given in the article 'ABR: Realizing the Promise of ATM', from the author Neil Rickard. This article was published in the magazine '*Telecommunications*', Vol. 29, No. 4, April 1995.

According to the ABR Standard ATM Forum/95-0013R10, an ABR source starts sending at an initial rate IR and increases its transmit rate exponentially until an upper limit ER, called explicit rate value, is reached. At regular time intervals, an ABR source inserts so called resource management cells in the transmitted cell stream. These resource management cells are reflected in the ATM network i.e., returned to the source nodes after being modified by nodes along the communication path between the source node and destination node. In this way, the feedback loop is constituted, allowing the ATM network to control the source transmit rate.

In the following paragraphs, a particular situation is described for the network drawn in FIG. 1, to explain how the above resource management cells should be used with respect to the present invention.

It is supposed that at a time 0, three connections are set up through the queuing point Q. A first connection is set up between source S1 and destination D1, a second connection is set up between source S3 and destination D3, and a third connection is set up between source node S4 and destination node D2. In addition, it is supposed that a fourth connection is set up between source node S2 and destination node D3 10 milliseconds after reference time 0. On its output, i.e. on the link between the queuing point Q and second switching node N2, the queuing point has a capacity of 100 Mbit/s available at time 0. To simplify the described situation it is supposed that this capacity available on the output link of queuing point Q remains constant. Each of the ABR sources S1, S3 and S4 in accordance to the ABR Standard starts transmitting at time 0 at the initial transmit rate IR which is supposed to be 20 Mbit/s. Thus, from time 0 on, sources S1, S3 and S4 send ATM cells into the queuing point Q at a rate of 20 Mbit/s each. At a time equal to half the round trip time RTT which allows resource management cells to travel to and from the queuing point Q, the queuing point Q measures the transmit rates of all connections passing through. In the described example, the round trip time RTT is supposed to be 2 milliseconds. Hence, after 1 millisecond, the actual packet rate, i.e., the current cell rate CCR measured by the queuing point Q for the connections between S1 and D1, S3 and D3, and S4 and D2 equals 20 Mbit/s each. The aggregate input flow of the queuing point Q at that moment is 60 Mbit/s. The queuing point Q thereupon generates explicit rate values ER for the three connections and returns these explicit rate values ER to the respective sources S1, S3 and S4 via the backward channel for resource management cells. The explicit rate value ER or maximum rate at which the sources S1, S3 and S4 are allowed to transmit in the future is calculated via the formulae:

$$ER = CCR * (1.1) \tag{1}$$

Formula (1) implies that each source, S1, S3 and S4, will be allowed to send data at a data rate which is 10% increased compared to the present transmit rate (current cell rate CCR). Applied to the three connections passing through the queuing point Q, a resource management cell whose explicit rate field ER is made equal to 20*(1.1)=22 Mbit/s is transmitted to source nodes S1, S3 and S4 and is received thereby at the time of 2 milliseconds. From this time on, sources S1, S3 and S4 increase their transmit rates up to 22 Mbit/s. More precisely, the respective output shapers SH1, SH3 and SH4 of the source nodes S1, S3 and S4 receive the resource management cells returned by the queuing point Q and oblige the transmit rate of the sources S1, S3 and S4 to stay below the new received explicit rate value ER, i.e. 22 Mbit/s. From FIG. 2B one can see for source that S1 at half the round trip time RTT, the explicit rate value ER as shown by the dashed line, determined by the queuing point Q increases. At a time RTT, the transmit rate SR of ABR source as shown by the solid line, S1 adapts to the new explicit rate value ER.

Figure 2A:
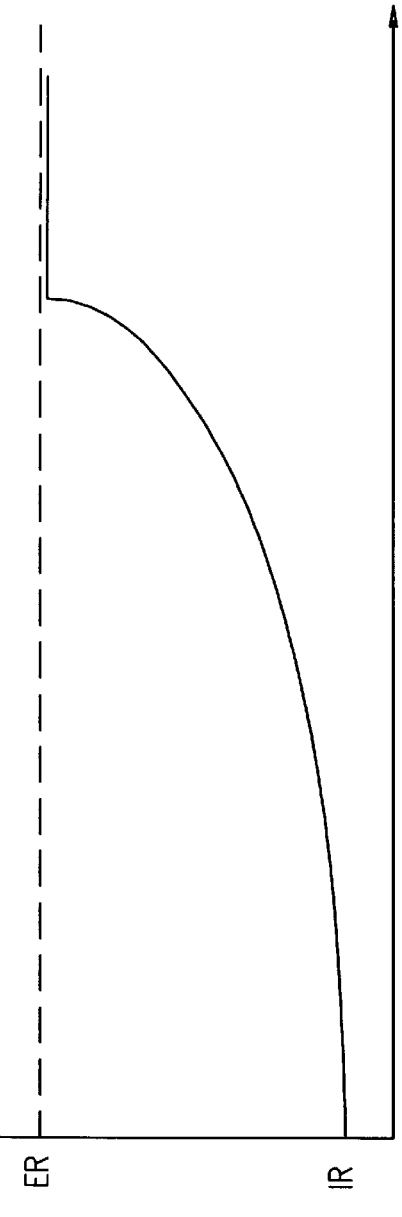
FIG. 2A is a graph illustrating an implementation of the known method.
Figure 2B:
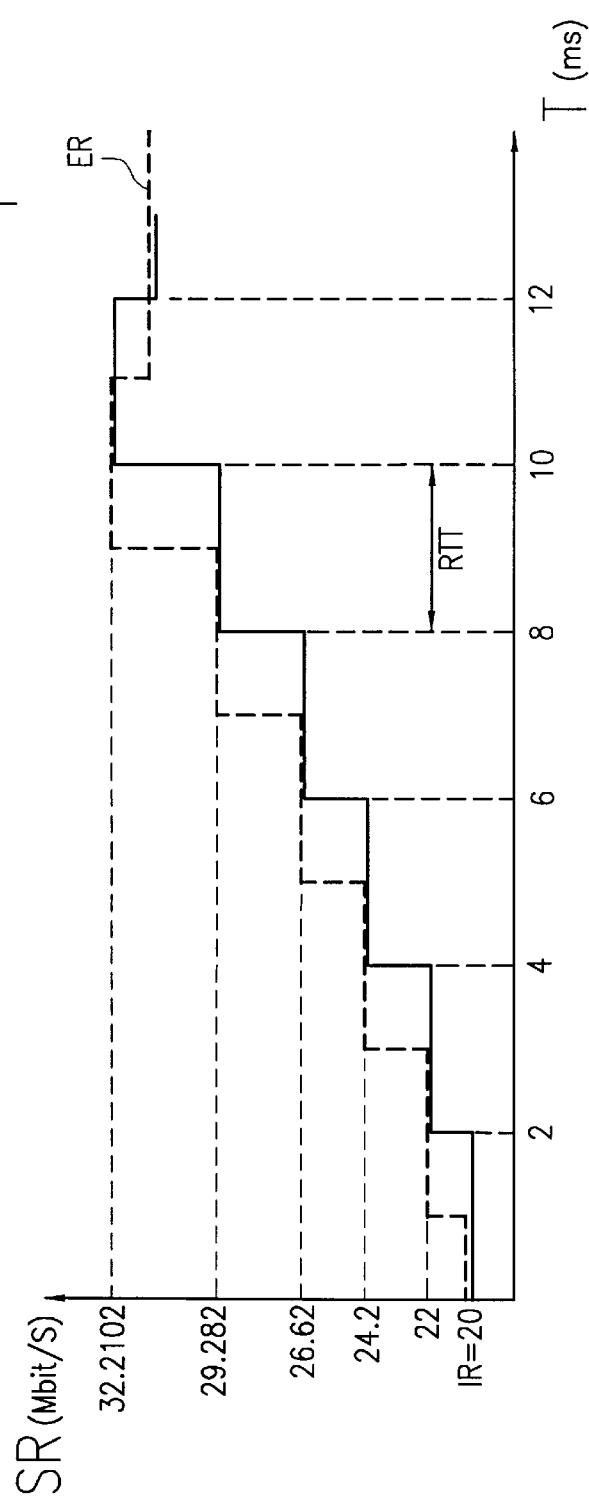
FIG. 2B is a graph illustrating an implementation of the method according to the present invention.

As long as the aggregate input flow of the queuing point Q stays below the available output capacity of 100 Mbit/s and under the condition that no other sources start transmitting data via connections through the queuing point Q, the above described procedure is repeated. Thus, at the time of 3 milliseconds, the queuing point Q measures the current cell rate CCR and calculates a new explicit rate value ER for each connection. This explicit rate value ER is 10% higher than the preceding explicit rate value ER if it is supposed that each of the sources S1, S3 and S4 has sufficient data to be transmitted and consequently has increased its transmit rate when this was allowed. At the time of 4 milliseconds, the resource management cells containing the new explicit rate values ER reach the output shapers SH1, SH3 and SH4 respectively, and the transmit rates of the ABR sources S1, S3 and S4 are increased. By using formulae (1), it can be verified that the sources S1, S3 and S4 from the time of 4 milliseconds on, transmit at 24.2 Mbit/s. In a similar way, the transmit rates are increased to 26.62 Mbit/s, to 29.282 Mbit/s and to 32.2102 Mbit/s at the time of 6 milliseconds, 8 milliseconds and 10 milliseconds respectively. The graph in FIG. 2B gives an overview of the evolution of the explicit rate value ER calculated by the queuing point Q for the connection between source S1 and destination D1 and of the transmit rate SR of source S1. From this figure, it is seen that the step between successive explicit rate values ER and consequently also the evolution of the transmit rate SR grows exponentially.

As already mentioned earlier, from the time of 10 milliseconds on, a connection is set up between source node S2 and destination node D3. As a consequence, source S2 starts transmitting at the initial rate IR of 20 Mbit/s at the time of 10 milliseconds. From this moment on, the aggregate input flow of the queuing point Q, 32.2102*3+20=116.6306 Mbit/s, exceeds the available output capacity of 100 Mbit/s. This is detected by the queuing point Q when it measures the current cell rates CCR of the different connections at the time of 11 milliseconds. As a result, the queuing point Q enters a second state of operation, called the congested state. The queuing point Q in the congested state no longer allows its aggregate input to increase. Nevertheless, further actions are performed to share the available output capacity of 100 Mbit/s on a fair basis among the four connections. The queuing point Q first calculates a fair share value FS for each one of the connections. In the most simple assumption, queuing point Q divides a target aggregate input flow of 100 Mbit/s by the number of connections, i.e. 4, and associates equal fair share values FS to each connection. In the described situation, the four connections get a fair share value FS of 25 Mbit/s each. In addition the connections are classified into two groups: a high rate group of connections whose current cell rate CCR is greater than the fair share value FS, and a low rate group of connections whose current cell rate CCR is lower than or equal to the fair share value FS. In the above example, the high rate group contains the connections between S1 and D1, S3 and D3 and S4 and D2, while the low rate group only contains the later set up connection between S2 and D3. The queuing point Q allows only connections which belong to the low rate group to further increase their transmit rates. The aggregate input flow of the queuing point Q in the congested state has to converge towards the target aggregate input flow which, in this particular embodiment, is chosen to be equal to the available capacity on the output of the queuing point Q i.e., 100 Mbit/s. Since the connection between source S2 and destination D3 was set up later, it did not yet get the possibility to increase its transmit rate exponentially. Therefore, this connection, even in the congested state, will be allowed to increase its rate. The three earlier set up connections will have to return part of the capacity that was occupied thereby. To determine a new set of explicit rate values ER at the time of 11 milliseconds, the queuing point Q uses following formulas: for the low rate group:

$$ER=CCR+(FS-CCR)*0.1 \quad (2)$$

for the high rate group:

$$ER=CCR-(CCR-FS)*0.1 \quad (3)$$

Since the sum of all fair share values FS equals the target aggregate input flow of the queuing point Q and the sum of all current cell rate values CCR equals the maximum future aggregate input, the formulas (2) and (3) fulfil the requirement of decreasing the aggregate input of the queuing point Q towards the target aggregate input flow by increasing the explicit rate values ER for low rate connections and decreasing the explicit rate values ER for high rate connections. Referring to the above example, the explicit rate values ER returned by the queuing point Q to the source nodes S1, S3, S4 and S2 for the connections between S1 and D1, S3 and D3, S4 and D2, and S2 and D3 become 32−0.1*(32−25)= 31.3 Mbit/s, 31.3 Mbit/s, 31.3 Mbit/s and 20+0.1* (25−20)= 20.5 Mbit/s respectively. As a consequence, the aggregate input flow at 12 milliseconds is equal to 31.3*3+20.5=114.4 Mbit/s.

The fair share calculation and the explicit rate calculation based on formulas (2) and (3) is repeated until the queuing point Q leaves the congested state is left. This happens for instance when additional capacity becomes available on the output link of the queuing point Q or when one of the existing connections is removed. This may also occur when the current cell rate CCR in one of the existing connections e.g. due to lack of data to be transmitted at the source node, drops down. Indeed, an advantage of the present invention is that capacity which is no longer used by a connection almost immediately gets free and can be allocated to other connections. This is seen from the formulas (1), (2) and (3) from which it is clear that in case the current cell rate CCR of a connection, due to lack of data to be transmitted, decreases, also the explicit rate value ER returned by the queuing point Q decreases. The present invention differs from the known method, illustrated by FIG. 2A, wherein an explicit rate value ER is determined and returned to a source and wherein the source is allowed to increase its transmit rate exponentially up to the explicit rate value ER. Whether or not this source has sufficient data to be transmitted, the allocated bandwidth ER remains reserved.

Figure 3:
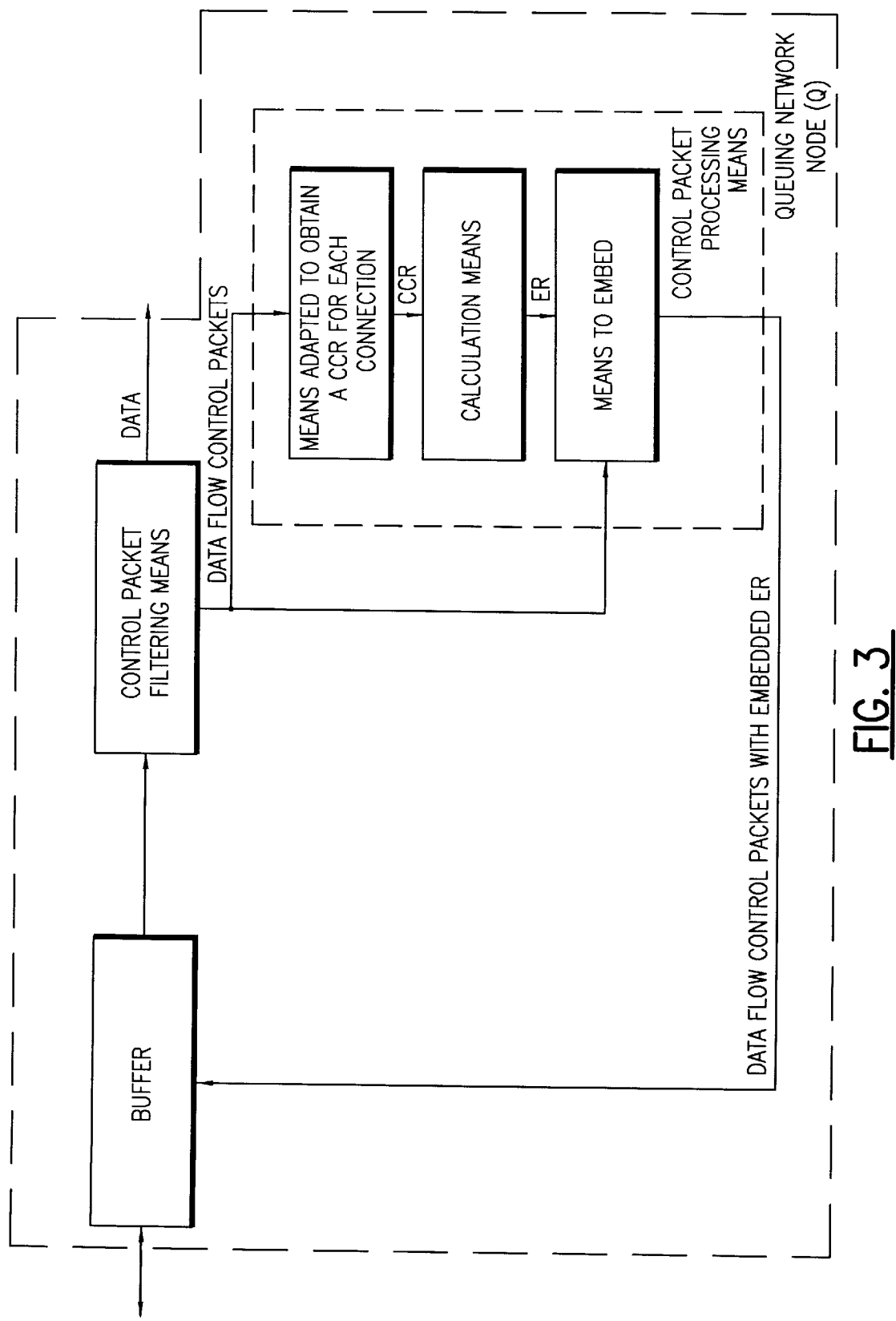
FIG. 3 illustrates a queuing network node, according the present invention.

FIG. 3 shows a queuing network node (Q) for instance for use in a packet switching network such as shown in FIG. 1 comprising a plurality of source terminals (S1, S2, S3, S4), a plurality of destination terminals (D1, D2, D3) coupled to the source terminals via network links and network nodes (N1, Q, N2) including the queuing network node. The queuing network node comprises a buffer means adapted to temporarily store data packets of a plurality of connections set up between the source terminals (S1, S2, S3, S4) and the destination terminals (D1, D2, D3) and passing through the queuing network node (Q). It also comprises control packet filtering means for retrieving data from the buffer including data flow control packets which are filtered thereby and provided to a control packet processing means. The control packet filtering means is adapted to filter data flow control packets out of a sequence of data packets transmitted by a source terminal (S1, S2, S3, S4). The control packet processing means is adapted to process the data flow control packets and it is equipped with means adapted to obtain an actual packet rate, i.e., current cell rate (CCR) for each one of the connections passing through the queuing network node (Q), a calculation means adapted to calculate for each one of the connections an upper packet rate value (ER) proportional to the actual packet rate (CCR), and means to embed the upper packet rate (ER) in a data flow control packet to be returned to the source terminal (S1, S2, S3, S4) via the buffer, directly or by some other equivalent means of feedback to the source nodes or their associated output shapers.

It has to be noticed that in the above example the round trip time RTT was supposed to be equal to 2 milliseconds for all sources S1, S2, S3, and S4. Obviously, this assumption was made to simplify the calculations. Since it is clear to a person skilled in the art that the described technique is also applicable to networks wherein different sources have different round trip times, the just mentioned assumption should not be seen as a restriction to the invention.

In addition, it is also noticed that to obtain the current cell rate CCR, the queuing node Q may also rely on the current cell rate values that are inserted by the ABR sources themselves in the resource management cells on transmission thereof. Hence, a cell rate measurement may become unnecessary. Indeed, according to the earlier cited ABR Standard, the source nodes S1, S2, S3 and S4 are supposed to insert their actual sending cell rate values in the current cell rate field of resource management cells. Relying upon this source generated information however may imply the danger of fraudulent use of these values by the ABR sources S1, S2, S3 and S4 in order to obtain a higher capacity from the queuing point Q.

Also a remark is that in the congested state, any fairness algorithm may be used to calculate the fair share values for the different connections. Since the object of the present invention is to control the source rates during the "not congested" state to lead the sources "in a network controlled way" to full occupancy of the available capacity, it is of no importance which algorithm is used in the congested state to share the resources amongst the different connections. An overview of fairness algorithms and parameters used thereby to share resources among a set of connections is given in the article 'A Taxonomy for Congestion Control Algorithms in Packet Switching Networks', from the authors Cui-Qing Yang and Alapti V. S. Reddy. This article was published in the magazine '*IEEE Network*', July/August 1995.

Furthermore, it will be obvious to a person skilled in the art that the criterion to determine congestion of a queuing point Q may be different from the one used in the above described embodiment. Instead of comparing the aggregate input flow to the available output capacity of the queuing point Q, congestion may be determined by monitoring the filling level of a buffer in the queuing point Q. Once a predetermined threshold level is exceeded, the congestion point Q may enter the congested state. Thus, the congestion criterion also should not be seen as a restriction to the present invention.

Yet another remark is that the present invention is not restricted to any of the figures assigned in the above example to e.g. the initial rate IR, the proportionality factors between explicit rate ER and current cell rate CCR, and so on.

A still further remark is that the output shapers which in the described embodiment keep the source transmit rates below the returned explicit rate values may be replaced by any other means, which is coupled to the output of a source terminal or integrated in a source terminals itself, and which is able to interpret the feedback flow rate control information and to thereupon control the sending rate of the source terminal.

Moreover it should be noted that, although the above described network is an ATM network with ABR sources and ABR destinations, the application of the present invention is not confined to the field of ABR or ATM. Small modifications, evident to a person skilled in the art, may be applied to the above described embodiment to adapt it to be integrated in other networks wherein rather delay-insensitive, bursty data packets are transmitted from source nodes to destination nodes via queuing means and wherein a feedback loop allows network nodes to control the transmit rate of the source nodes. For instance in LAN (Local Area Network) or computer networks or in an ATM network which supports service classes such as the VBR+ (Variable Bit Rate Plus) class described in the already cited article 'ABR: Realizing the Promise of ATM', the present invention is applicable.

While the principles of the invention have been described above in connection with specific apparatus, it is to be clearly understood that this description is made only by way of example and not as a limitation on the scope of the invention.

We claim:

1. A method to control a data flow rate of data transmitted over a connection, set up between a source terminal (S1, S2, S3, S4) and a destination terminal (D1, D2, D3) via a plurality of network links and network nodes (N1, Q, N2) at least one of which (Q) constitutes a queuing network node which is able to return data flow control packets to said source terminal (S1, S2, S3, S4, said data flow control packets containing information based on which said data flow rate is to be controlled in said source terminal (S1, S2, S3, S4), characterized in that, in a first state wherein said queuing network node (Q) is not congested, said queuing network node (Q) before a said data flow control packet is returned, performs the steps of:
   a. obtaining an actual packet rate (CCR) of data transmitted over said connection;
   b. calculating an upper packet rate value (ER) in proportion to said actual packet rate (CCR);
   c. embedding said upper packet rate value (ER) in said data flow control packet; and
   d. keeping said data flow rate at said source terminal (S1, S2, S3, S4) below said upper packet rate value (ER).

2. A method according to claim 1 characterized in that to perform said step d an output shaping device (SH1, SH2, SH3, SH4) at the output of said source terminal (S1, S2, S3, S4), upon receipt of said data flow control packet, keeps said data flow rate below said upper packet rate value (ER).

3. A method according to claim 1, characterized in that, in a second state wherein said queuing network node (Q) is congested, said queuing network node (Q), before said data flow control packet is returned, performs the steps of:
   e. calculating based on a fairness algorithm, a fair share value (FS) for each connection which is similar to said connection and which passes through said queuing network node (Q);
   f. increasing for each said connection passing through said queuing network node (Q) and whose actual packet rate (CCR) is lower than said fair share value (FS), said upper packet rate value (ER); and
   g. decreasing for all other connections which pass through said queuing network node (Q), said upper packet rate value (ER), in such a way that an aggregate input flow of said queuing network node (Q) converges towards a target aggregate input flow.

4. A method according to claim 3, characterized in that, in said step f, said upper packet rate value is calculated in proportion to said actual packet rate (CCR).

5. A method according to claim 4, characterized in that in said step f, said upper packet rate value is increased by an amount (FS-CCR) times k, and in said step g said upper packet rate is decreased by an amount (CCR-FS) times k, wherein FS represents said fair share value (FS), CCR represents said actual packet rate (CCR) and k represents a proportionality factor.

6. A method according to claim 1, characterized in that successive ones of said data flow control packets are transmitted at regular time intervals which are connection dependent and are equal to a round trip time (RTT) of a said data flow control packet.

7. A method according to claim 1, characterized in that in said first state, an aggregate input flow of said queuing network node (Q) is lower than or equal to an aggregate output flow thereof.

8. A method according to claim 3, characterized in that, in said second state, an aggregate input flow of said queuing network node (Q) exceeds an aggregate output flow thereof.

9. A queuing network node (Q) for instance for use in a packet switching network comprising a plurality of source terminals (S1, S2, S3, S4), a plurality of destination terminals (D1, D2, D3) coupled to said source terminals (S1, S2, S3, S4) via network links and network nodes (N1, Q, N2) including said queuing network node, said queuing network node (Q) comprising:
   a. buffer means adapted to temporarily store data packets of a plurality of connections set up between said source terminals (S1, S2, S3, S4) and said destination terminals (D1, D2, D3) and passing through said queuing network node (Q);

b. control packet filtering means adapted to filter data flow control packets out of a sequence of data packets transmitted by a source terminal (S1, S2, S3, S4); and c. control packet processing means adapted to process said data flow control packets;

characterized in that said control packet processing means is equipped with:

d. means adapted to obtain an actual packet rate (CCR) for each one of said connections passing through said queuing network node (Q);

e. calculation means adapted to calculate for each one of said connections an upper packet rate value (ER) proportional to said actual packet rate (CCR); and f. means to embed said upper packet rate (ER) in a said data flow control packet to be returned to said source terminal (S1, S2, S3, S4).

10. A packet switching a plurality of source terminals (S1, S2, S3, S4), a plurality of destination terminals (D1, D2, D3) coupled to said source terminals (S1, S2, S3, S4) via network links and network node including:

a. buffer means adapted to temporarily store data packets of a plurality of connections set up between said source terminals (S1, S2, S3, S4) and said destination terminals (D1, D2, D3) and passing through said queuing network node (Q);

b. control packet filtering means adapted to filter data flow control packets out of a sequence of data packets transmitted by one of said source terminals (S1, S2, S3, S4); and c. control packet processing means adapted to process said data flow control packets;

characterised in that said control packet processing means is equipped with:

d. means adapted to obtain an actual packet rate (CCR) for each one of said connections passing through said queuing network node (Q);

e. calculation means adapted to calculate for each one of said connections an upper packet rate value (ER) proportinal to said actual packet rate (CCR); and f. means to embed said upper packet rate (ER) in a said data flow control packet to be returned to said source terminal (S1, S2, S3, S4).

* * * * *